(12) United States Patent
Metzbower et al.

(10) Patent No.: US 7,142,481 B1
(45) Date of Patent: Nov. 28, 2006

(54) METHOD AND SYSTEM FOR MAKING MARINE SEISMIC STREAMERS

(75) Inventors: D. Richard Metzbower, Austin, TX (US); Steven J. Maas, Pflugerville, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/345,531

(22) Filed: Feb. 1, 2006

Related U.S. Application Data (60) Provisional application No. 60/716,264, filed on Sep. 12, 2005.

(51) Int. Cl.
*G01V 1/20* (2006.01)
*H01B 7/12* (2006.01)
*B29C 44/12* (2006.01)

(52) U.S. Cl. .................. 367/154; 174/101.5; 264/45.3; 264/45.9

(58) Field of Classification Search ................ 367/154; 174/101.5, 110 F, 100 F; 265/45.3, 45.9; 264/45.3, 45.9
See application file for complete search history.

(56) References Cited

U.S. PATENT DOCUMENTS

| | | | |
|---|---|---|---|
| 3,744,016 A * | 7/1973 | Davis | 367/154 |
| 3,900,543 A * | 8/1975 | Davis | 264/45.3 |
| 4,790,961 A | 12/1988 | Weiss et al. | |
| 5,716,574 A | 2/1998 | Kawasaki | |
| 5,892,116 A | 4/1999 | Weiss et al. | |
| 6,387,179 B1 | 5/2002 | Anderson et al. | |
| 6,743,387 B1 | 6/2004 | Belli et al. | |
| 2004/0042341 A1 | 3/2004 | Tenghamn et al. | |

* cited by examiner

*Primary Examiner*—Mark Hellner
(74) *Attorney, Agent, or Firm*—E. Eugene Thigpen; Richard A. Fagin

(57) ABSTRACT

An apparatus for making a marine seismic streamer includes a conveyor for transporting assembled mechanical harness from a storage device therefor to a storage device for storing completed marine streamer. The apparatus includes a first extruder for filling the harness with a void fill material and a second extruder for depositing jacketing material onto the filled harness both extruders being intermediate the two storage devices. A means for changing state of the void filling material is disposed proximate an outlet of the first extruder. In one embodiment, the means for changing state includes a radiation source.

22 Claims, 4 Drawing Sheets

METHOD AND SYSTEM FOR MAKING MARINE SEISMIC STREAMERS

CROSS-REFERENCE TO RELATED APPLICATIONS

This application claims priority under 35 U.S.C. 119(e) to U.S. Provisional Application Ser. No. 60/716,264, filed on Sep. 12, 2005, entitled "Method and System for Making Seismic Streamers", the disclosure of which is incorporated herein by reference in its entirety.

Statement regarding federally sponsored research or development

Not applicable.

BACKGROUND OF THE INVENTION

1. Field of the Invention

The invention relates generally to the field of seismic surveying apparatus. More specifically, the invention relates to methods and apparatus for making marine seismic sensor streamer cables.

2. Background Art

Marine seismic surveying is typically performed using "streamers" towed near the surface of a body of water. A streamer is in the most general sense a cable towed by a seismic vessel. The cable has a plurality of seismic sensors disposed at spaced apart locations along its length. The sensors are typically hydrophones, but can also be any type of sensor that is responsive to the pressure in the water, or to changes in the pressure with respect to time. The sensors may also be any type of particle motion sensor or acceleration sensor known in the art. Irrespective of the type of such sensors, the sensors generate an electrical or optical signal that is related to the parameter being measured by the sensors. The electrical or optical signals are typically carried along electrical conductors or optical fibers carried by the streamer to a recording system. The recording system is typically disposed on the seismic vessel, but may be disposed elsewhere.

In a typical marine seismic survey, a seismic energy source is actuated at selected times, and a record, with respect to time, of the signals detected by the one or more sensors is made in the recording system. The recorded signals are later used for interpretation to infer structure of, fluid content of, and composition of rock formations in the Earth's subsurface.

A typical marine seismic streamer can be up to several kilometers in length, and can include hundreds of individual seismic sensors. Because of the weight of all of the materials used in a typical marine seismic sensor, because of the friction (drag) caused by the streamer as it is moved through the water, and because of the need to protect the sensors, the electrical and/or optical conductors and associated equipment from water intrusion, a typical seismic streamer includes certain features. First, the streamer includes one or more strength members to transmit axial force along the length of the streamer. The strength member is operatively coupled to the seismic vessel and thus bears all the loading caused by drag (friction) of the streamer in the water. The streamer also typically includes, as previously explained, electrical and/or optical conductors to carry electrical power and/or signals to the various sensors and to signal conditioning equipment disposed in the streamer in some streamer types. The electrical and/or optical conductors also carry signals from the various sensors to a recording station. The streamer typically includes an exterior jacket that surrounds the other components in the streamer. The jacket is typically made from a strong, flexible, acoustically transparent plastic such as polyurethane, such that water is excluded from the interior of the streamer, and seismic energy can pass essentially unimpeded through the jacket to the sensors inside the jacket. A typical streamer also includes devices placed periodically throughout the streamer, called spacers, that provide mechanical stability and selected physical properties to the streamer. The spacers can be of various types which fix the positions of the "harness" (the assembled sensors and their electrical and/or optical connections and conductors therefor) and the strength members, provide mounting fixtures for electronic devices or the sensors themselves, and provide other functions such as providing the streamer with a selected degree of buoyancy. Some of the spacers, therefore, may be fabricated from material chosen primarily for the specific gravity. The number of and spacing of the various spacers are chosen to provide selected overall buoyancy for the streamer as necessary.

A seismic streamer, including the various components described above, is typically made by assembling the various spacers to the one or more strength members. Some of the spacers have seismic sensors embedded in them or attached to them. The signal output of the various sensors is coupled to the electrical and/or optical cable as described above. The assembled spacers, sensors and cable are then inserted into the jacket, and the interior space or "void" within the jacket is then filled with a suitable filling material. The void filling material provides elastic support to the streamer jacket, provides electrical insulation to any electronic components inside the streamer and can provide some degree of positive buoyancy for ballasting. Filling materials known in the art include gelled hydrocarbon-based oil, hydrocarbon based oil, visco-elastic polymer or other suitable electrically insulating, acoustically transparent materials.

For practical reasons, streamers are typically made as explained above in limited-length segments, typically about 75 meters each. Each streamer segment includes a termination plate at its axial ends. The termination plates include electrical and/or optical connectors that mate with corresponding connectors in the termination plate of another such streamer segment. The termination plate includes features to couple the strength member such that the axial force can be transmitted along the one or more strength members from segment to segment through coupled termination plates. A typical marine seismic streamer, which may be up to several kilometers long as explained above, may thus made from a large number of streamer segments coupled end to end, and ultimately to the seismic vessel.

Seismic streamer-segment manufacturing known in the art is typically performed as follows. A "mechanical harness" is fabricated using one or more strength members having the same length as the intended length of the segment, as described above, and spacers are affixed to the strength member(s) at selected locations along the length thereof. As previously explained, some of the spacers may provide mounting facilities for one or more seismic sensors, and may also as explained above be made from selected materials that give the streamer segment a selected overall density (generally be substantially neutrally buoyant in water). The assembly of spacers and strength members is referred to as a "mechanical harness." The one or more strength members are attached at each end to a termination plate. An electrical and/or optical harness that includes one or more insulated electrical conductors and/or optical fibers is typically fabricated contemporaneously with the assembly of spacers and strength member(s), and is subsequently inserted into or otherwise coupled to the mechanical harness. Insertion may be performed by locating the seismic sensors within selected components in the mechanical harness (typically the spacers) and threading or engaging a bundle of electrical and/or optical conductors ("wire bundle") through appropriate openings in the spacers. Connector inserts are then soldered or otherwise attached to the longitudinal ends of the conductors that are used to transit signals between the segments. Then the connector inserts are installed into respective connector housings. The connector housings are attached to the mechanical harnesses at the termination plates, thus completing assembly of both the internal harnesses.

At this point the internal harnesses are ready to be "skinned" and "filled." Skinning is the insertion of the internal harnesses into the protective jacket, and filling is the injection of the electrically insulating, possibly buoyant and acoustically transparent material into the jacket to provide the streamer with the mechanical properties explained above. The skinning and filling procedures are generally performed in one operation, however, they can be performed in separate operations. In the single operation method, the harnesses are loaded into a tube or other pressure vessel, and the fill material, in liquid state, is also loaded into the tube. The protective jacket is brought up to the end of the tube and pressure applied in the tube to inject the internal harnesses and fill material into the protective jacket.

As can be readily inferred from the above description, making seismic streamers using manufacturing methods and systems known in the art can be difficult and time consuming. Further, it is necessary to provide manufacturing facilities of sufficient floor length to enable assembly of the harnesses and injection thereof into the protective jacket. The typical area of manufacturing plant dedicated to streamer assembly is divided into two general departments. One department typically performs the harness fabrication and testing. The other department typically performs skinning and filling operations. While increasing the length of the streamer would impose a burden on both of the departments, the burden is more severe on the skinning and filling department. The burden is more severe due not only to the additional floor space that would be required (this is also a burden for the harness assembly department) but to the additional capital equipment such as harness loading tubes, pressure tanks and stainless steel tables equipped with drain systems to collect fill material spillage. Additionally, unlike the bare harness, the filled and skinned section is more difficult to handle since it is more resistant to bending and cannot simply be folded over on itself to be worked on as can be done when sensors and electronics are being installed into the harness. The foregoing requirements have effectively limited the practical length of streamer segments that can be made using known manufacturing methods. Furthermore, some types of the material used to fill the streamer are intended to change state, from a liquid to a gel or semi-solid, after insertion of the harnesses. Some compositions of gel can require cure times of up to 14 days, during all of which the streamer segment must be extended straight out in order to maintain proper mechanical properties in the streamer after gel cure.

Increasing the length of manufactured seismic streamer segments is desirable for a number of reasons. First, increasing the manufactured segment length would provide cost and operational benefits. The cost benefit would result from reduction in the number of connector housings and inserts. Both the connector housings and inserts are costly and any increase in section length directly translates into a corresponding reduction in the number of connector housings and inserts and consequently cost. Operationally, the connector inserts are a frequent failure point for the streamer segments, are by nature negatively buoyant and a source for noise. Therefore reduction in the number of inserts in an operational streamer can increase the overall streamer reliability and operational effectiveness. The negative buoyancy of the connector housings and inserts require addition of a large amount of lower density material for ballasting the streamer and impact flexibility in streamer design by practically limiting the amount of heavier-than-water components (wire, sensors, electronics, etc) that can be added to the streamer section.

There continues to be a need to reduce the time, cost and work space needed to manufacture marine longer lengths of seismic streamer sections.

SUMMARY OF THE INVENTION

One aspect of the invention is an apparatus for making a marine seismic streamer. An apparatus according to this aspect of the invention includes a conveyor for transporting assembled mechanical harness from a storage device for the harness to a storage device for storing completed marine streamer. The assembled harness includes at least one strength member, a plurality of seismic sensors disposed in spacers and positioned at spaced apart locations along the strength member, and a conductor harness having at least one conductor coupled to respective signal output of each seismic sensor. The apparatus includes a first extruder for filling the harness with a void fill material. The first extruder is disposed intermediate the storage device for the harness and the storage device for the completed streamer. The apparatus also includes a second extruder for depositing jacketing material onto the filled harness. The second extruder is also located intermediate the storage device for the harness and the storage device for the completed streamer.

Another aspect of the invention is a method for making a marine seismic streamer. A method according to this aspect of the invention includes conveying assembled mechanical harness toward a storage device for completed streamer. The harness includes at least one strength member, a plurality of seismic sensors disposed in spacers and positioned at spaced apart locations along the strength member, and a conductor harness having at least one conductor coupled to a respective signal output of each seismic sensor. The harness is filled with a void fill material intermediate the storage device for the harness and the storage device for the completed streamer. The void fill material includes a radiation curable gel. The void fill material is caused to undergo a state change from liquid to gel. A jacketing material is extruded onto the gel filled harness, and the filled, extruded harness is conveyed to the storage device for the completed streamer.

Other aspects and advantages of the invention will be apparent from the following description and the appended claims.

DETAILED DESCRIPTION

Figure 1:
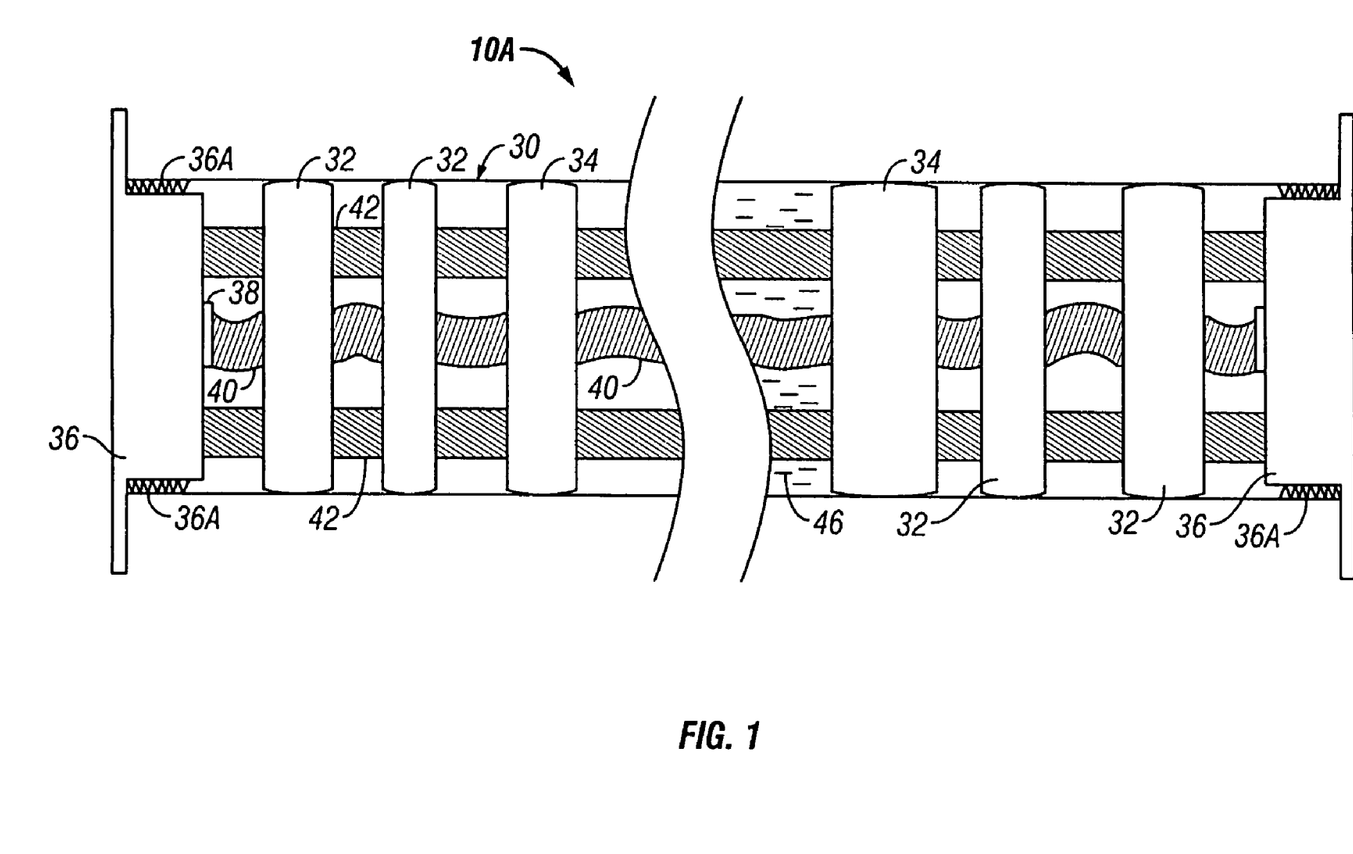
FIG. 1 shows a cut away view of a typical streamer

FIG. 1 is a cut away view of a portion ("segment") 10A of a fully fabricated marine seismic streamer that may be made using a processing line and method according to the various aspects of the invention. In its fully fabricated form, the streamer segment 10A may be about 75 meters overall length, although the length of any particular segment is not a limitation on the scope of this invention. A streamer, for purposes of a seismic survey, may thus be formed by connecting a selected number of such segments 10A end to end. The segment 10A includes a jacket 30, which in the present embodiment can be made from nominally 3 mm thick transparent polyurethane having a nominal external diameter of about 62 millimeters.

In each such streamer segment 10A, each axial end of the jacket 30 may be terminated by a coupling/termination plate 36 ("termination plate"). The termination plate 36 may include elements 36A on the portion of its outer surface that is inserted into the end of the jacket 30 to seal against the inner surface of the jacket 30, and to grip the termination plate 36 to the jacket 30 when the jacket is clamped externally (not shown). In the invention, the termination plates 36 may be affixed to the segment 10A after all the other process elements have been performed.

In the present embodiment, two strength members 42 may be coupled to an appropriate coupling feature (not shown separately) located on the interior of each termination plate 36. The strength members 42 extend the length of the segment 10A. In a particular implementation, the strength members 42 may be made from a fiber rope, using a fiber sold under the mark VECTRAN, which is a registered trademark of Hoechst Celanese Corp., New York, N.Y. The strength members 42 transmit axial force along the length of the segment 10A. When one segment 10A is coupled end to end to another segment (not shown in FIG. 1), mating termination plates 36 are coupled together using any suitable connector, so that the axial force is transmitted through the termination plates 36 from the strength members 42 in one segment 10A to the strength members in the adjoining segment.

The segment 10A typically includes spacers, shown at 32 and 34, disposed inside the jacket 30 at spaced apart locations along the length of the segment 10A. The spacers may be of two types; buoyancy spacers 32 and "structural" or "sensor" spacers 34. The buoyancy spacers 32 may be made from foamed polypropylene. The buoyancy spacers 32 have a density selected to provide the segment 10A with approximately the same overall density as seawater so that the streamer will be substantially neutrally buoyant in seawater. As a practical matter, the buoyancy spacers 32 provide the segment 10A with an overall density very slightly less than that of fresh water. Appropriate overall density may then be adjusted in actual use by affixing selected amounts of dense ballast (not shown) to the exterior of the jacket 30, thus providing any necessary adjustment in the streamer buoyancy for changes in water temperature and water salinity. The sensor spacers 34 may be made from foamed polyurethane or other suitable material. The sensor spacers 34 are typically used to support the jacket 30 and to provide a mounting platform for the seismic sensors (not shown separately in the Figures).

The segment 10A can include a generally centrally located conductor harness 40 which typically includes a plurality of insulated electrical conductors (not shown separately), and may include one or more optical fibers (not shown separately). Electrical and/or optical conductors (not shown) in the conductor harness 40 conduct electrical and/or optical signals from the sensors (which will be further explained below) to the recording system, generally located on a seismic vessel. The conductor harness 40 may also include electrical wiring (not shown separately) carry electrical power to various signal processing circuits (not shown separately) disposed in one or more streamer segments 10A, or disposed elsewhere along the streamer. The extended length of the conductor harness 40 within a streamer segment 10A is generally longer than the overall axial length of the streamer segment 10A under the largest expected axial stress, so that the electrical conductors, and optical fibers if present, will not experience any substantial axial stress when the streamer is towed through the water by the seismic vessel. The conductors and optical fibers (not shown) may be terminated in a connector 38 disposed in each termination plate 36, so that when the segments 10A are connected end to end, corresponding electrical and/or optical connections may be made between the electrical conductors and optical fibers in the conductor cable in the adjoining streamer segments 10A.

Seismic sensors (not shown separately), which in the present embodiment may be hydrophones, velocity sensors or accelerometers, can be disposed in selected ones of the sensor spacers, shown in FIG. 1 generally at 34. Hydrophones, if used in any particular embodiment, can be or a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular streamer segment configuration, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer. It should be clearly understood, however, that the types of sensors used, the electrical and/or optical connections used, the number of such sensors, and the spacing between such sensors described above are only meant to illustrate a possible embodiment of a streamer segment, and are not intended to limit the scope of this invention. In other embodiments, the sensors may be particle motion sensors such as geophones, or accelerometers. A marine seismic streamer having particle motion sensors is described in U.S. patent application Ser. No. 10/233,266, filed on Aug. 30, 2002, entitled, "Apparatus and Method for Multicomponent Marine Geophysical Data Gathering", assigned to an affiliated company of the assignee of the present invention and incorporated herein by reference.

In making a streamer segment, as can be inferred from the foregoing description, the conductor harness 40, sensors (not shown separately), spacers 32, 34 and strength members 42 are typically assembled prior to inserting them into the jacket 30. For purposes of describing a method and apparatus for making streamer segments, to be explained in more detail below with reference to FIG. 2, the assembled conductor harness 40, spacers 32, 34, sensors (not shown) and strength members 42 will be referred to as a "mechanical harness." In one embodiment of a method and system according to the invention, a substantial length of such mechanical harness, typically enough to make a plurality of streamer segments, can be stored on a device such as a reel for use in a continuous, automated manufacturing process.

In order to complete the streamer segment 10A, the mechanical harness is impregnated or filled with a void filling material, shown at 46, that fills all the interstitial space inside the jacket 30 that is not occupied by the various components of the mechanical harness. The void filling material 46 used in a method according to the invention can be from among several broad classes of materials, for example, hot melt adhesives, thixotropic filling compounds and thermoplastics. A desirable property of the void filling material 46 is that it can undergo liquefaction with the application of heat and pressure as would be experienced in an extruder (as will be explained with reference to FIG. 2). The void filling material 46 is preferably a hydrocarbon-based oil or oil blend that has been gelled using a gelation agent such as an elastomer polyurethane compound or other cross-linked elastomer, wherein the gelation is thermally reversible. In some embodiments, the gelation agent can be a type of polymer that undergoes cross-linking when it is exposed to radiation, such as ultraviolet light or electron beam radiation. Generally, the void filling material will undergo a state change after filling all the void space in the mechanical harness. Such state change may be effected by application of heat to break the gel, when thermally reversible gels are used, followed by cooling to reform the gel. State change may also be effected by exposing radiation curable gel in its liquid form to a source of radiation.

Figure 2:
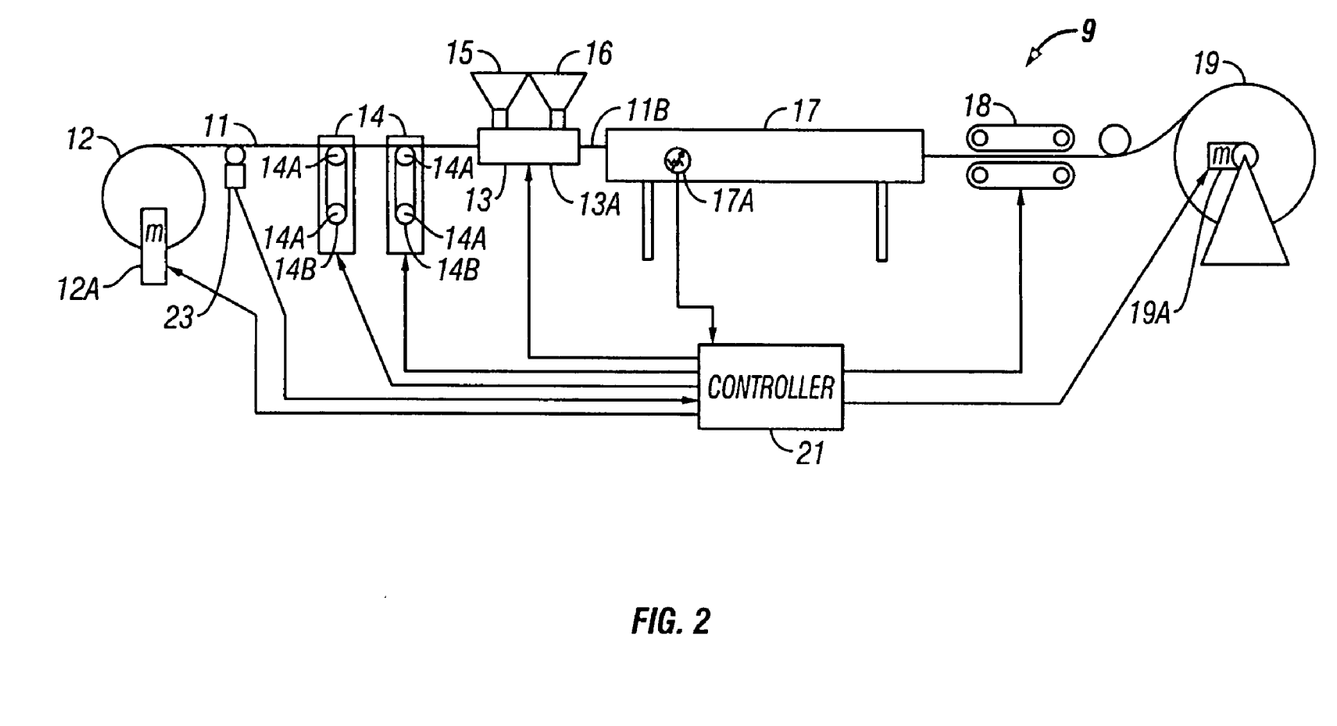
FIG. 2 shows one embodiment of an automatic skinning and filling system according to the invention.

FIG. 2 shows a schematic diagram of principal stages of a processing line 9 for "skinning and filling" operations for the production of streamer in accordance with the present invention. The processing line 9 can include the following principal elements. There may be a device for unwinding assembled mechanical harness from a storage reel, and moving the mechanical harness into an extruder. There may be a device for moving the void filling material (46 in FIG. 1) in into the extruder. There may be a device for moving the material that will form the jacket (30 in FIG. 1) from a storage container in un-liquefied form into the same or a different extruder. There may be a device, proximate the jacket extruder, for liquefaction of the jacket material, such as by heating within the extruder. Depending on the particular void fill material used as, there may also be a device proximate to the void fill extruder for liquefying the fill material, such as by heating within the extruder. There may also be a means for conveying the liquefied void fill and jacket material into respective extrusion dies where the void filling and jacket materials are deposited around the mechanical harness. With respect to the void fill material, there may be an element for causing the void fill material to undergo a state change from liquid to gel. There may also be a device for cooling the extruded streamer having the void fill and jacket materials extruded thereon. Finally there may be a device for collecting the finished streamer onto a storage device such as a reel.

The material used to fill the streamer segment, as previously stated, is preferably a cross-linkable type polymer, and in some embodiments the cross-linking can be thermally reversible. In some embodiments, radiation may be applied to the streamer in the extruder just after the mechanical harness has the void fill material applied to it to cause the void fill material to undergo a state change from liquid to gel. In another example, pre-cured, thermally reversible gel may be extruded into the mechanical harness, subjected to heat to liquefy the gel, and then cooled to return the void fill material to the gel state prior to extrusion of the jacket onto the filled mechanical harness.

In the present embodiment, the foregoing elements of the processing line 9 can include a supply reel 12 onto which a substantial quantity of assembled mechanical harness 11 (such harness made explained above with reference to FIG. 1) can be stored. The quantity is typically enough to make a plurality of streamer segments (10A in FIG. 1). The supply reel 12 may include its own drive motor 12A, or may be rotated partially or entirely by the tension provided by a tensioning conveyor 14 onto the harness 11 to move the harness 11 into an extruder 13.

The tensioning conveyor 14, located between the supply reel 12 and the extruder 13 can include a plurality of pulleys 14A, drive belts 14B, a drive motor (not shown separately) and associated hardware whose purpose is to ensure a regular and continuous movement of the harness 11 into the extruder 13, and also to apply to the harness 11 a predetermined tension so as to ensure uniform geometry of the harness 11 components and uniform extrusion of the void filling material (46 in FIG. 1) and jacket (30 in FIG. 1) onto the harness 11. Tensioning conveyors are well known in the art of extrusion processing.

The extruder 13 can include material storage hoppers 15, 16 for storing the materials that will be used for the void filler (46 in FIG. 1) and for the jacket (30 in FIG. 1), respectively. The materials in the hoppers 15, 16 are applied to the mechanical harness 11 within a crosshead extruder die 13A forming part of the extruder 13. After leaving the extruder 13, the mechanical harness, shown at 11B after being filled and jacketed, can then be passed to a cooling and/or drying channel 17, wherein the extruded fill and jacket materials can be cooled and/or dried to attain their finished mechanical properties. The cooling and/or drying channel 17 may include (not show separately) cooling elements and/or air blowers for such purposes.

A detensioning conveyor 18 may be located after the outlet of the cooling channel 17. The detensioning conveyor 18 pulls the extrusion-processed harness 11B from the cooling channel 17 and moves it along to a storage reel 19 for later processing. The storage reel 19 will typically include its own drive motor 19A. Tension is removed from the extruded harness 11B by the detensioning conveyor 18. The detensioning conveyor 18 works in conjunction with the tensioning conveyor 14 to maintain a regular and uniform movement rate of the harness 11 into and out of the extruder 13. Later processing of the completed streamer may include wiring and coupling termination plates (36 in FIG. 1) to selected lengths of completed streamer.

Automatic operation of all the foregoing processing line 9 components may be performed by a controller 21, such as a microprocessor-based programmable logic controller (PLC) of any type known in the art for process control. The controller 20 may be coupled to various sensors disposed in various parts of the processing line 9 to monitor various parameters of the entire process. The controller 20 can also provide system operator interface to the processing line 9. The controller 20 can measure such parameters as temperature in the cooling channel using temperature sensor 17A, feed rate using a combination rotary encoder/tension sensor 23, tension using the combination rotary encoder/tension sensor 23, hopper fill level, extruded jacket diameter and any other such parameters as are desirable to assure integrity of the manufacturing process and quality of the completed streamer.

Prior to the startup of the processing line 9 to make the streamer according to the present embodiment, the hoppers 15 and 16 can be filled with the materials (46A, 30A in FIG. 3) that will become the void fill (46 in FIG. 1) and jacket (30 in FIG. 1), respectively. In this schematic representation of the processing line 9, hopper 15 can contain the void filling material 46A and hopper 16 can contain the jacket material 30A. Simultaneously with the movement of the harness 11 into the extruder 13, the materials (46A, 30A in FIG. 3) in the hoppers, 15 and 16, respectively, are fed into the inlets (explained with reference to FIG. 3) of the extrusion head 13A of the extruder 13 in a manner know in the art.

Figure 3:
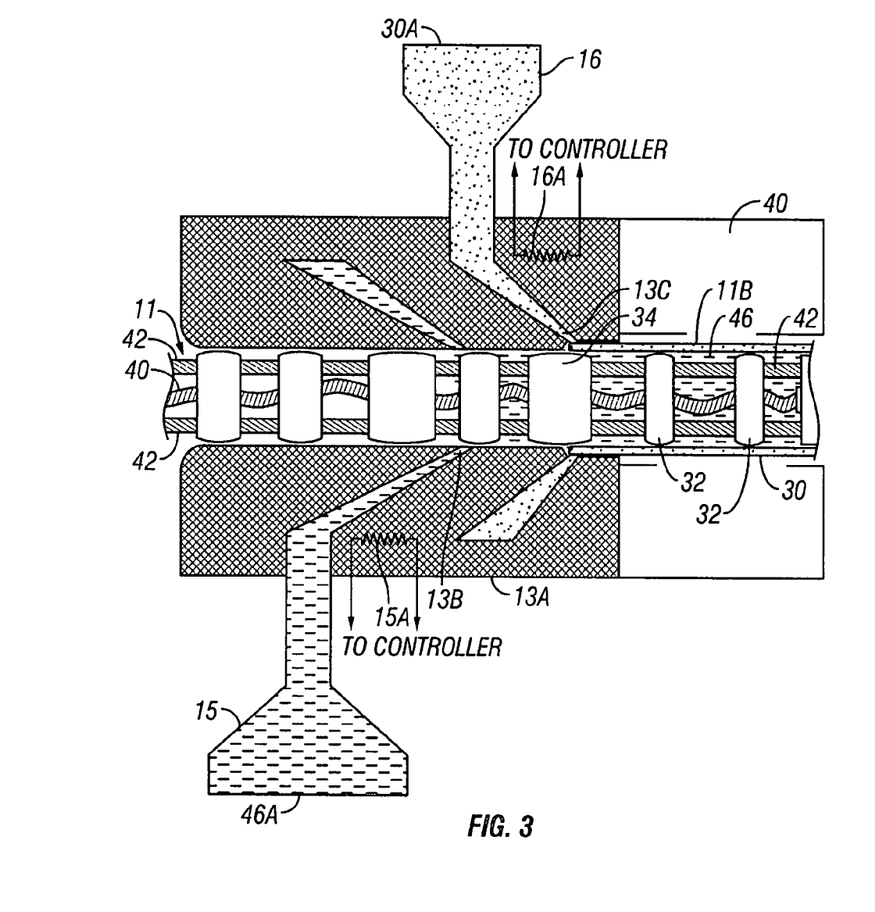
FIG. 3 shows one embodiment of a cross-head extruder die that can be used with the system of FIG. 2.

A simplified section view of one embodiment of the extruder head 13A is shown in FIG. 3. Within the extruder head 13A, the void fill and jacket materials, 46A and 30A, respectively, are moved through respective inlets toward corresponding die orifices 13B, 13C in the extruder head 13A, and are separately brought to the liquid state, such as by electric heating elements 15A, 16A associated with each of the die orifices 13B, 13C. By the work performed by internal screws (not shown) the materials 46A, 30A are separately pushed through the two respective extrusion die orifices 13B, 13C and into place, thus filling and covering the mechanical harness 11.

The particular type of extruder, and its exact configuration, are matters of discretion for the system designer, however there are several published examples of extruder systems used to produce electrical wire and cable that are similar in principle to the extruder that can be used in configuring various embodiments of the extruder for use in the invention. One such extruder is shown is U.S. Pat. No. 5,716,574 issued to Kawasaki entitled, "Process for the Production of Power Cable." The Kawasaki '574 patent describes a process for using a crosshead extruder to deposit multiple layers of insulation and jacketing onto electrical power cables. U.S. Pat. No. 6,743,387 issued to Belli et al. entitled. "Process for the Production of a Cable and Device for Performing this Process" describes another process for using a crosshead extruder to deposit multiple layers of insulation and jacketing onto power cables. Another example of a crosshead extruder die that may be used advantageously with a system to make streamers according to the invention is disclosed in U.S. Pat. No. 6,387,179 issued to Anderson et al., and incorporated herein by reference.

The harness 11, as stated previously, is essentially completely assembled, and lacks only the void filling material and the jacket to become a completed streamer. As the harness 11 proceeds into the extruder head 13A it passes the first extruder die orifice 13B. The void fill material 46A is contained in hopper 15 and is fed from the hopper 15, liquefied by the heating element 15A and is ejected through the die orifice 13B to fill the void space in the harness 11. In the present embodiment, the fill material 46A, disposed in hopper 15, can be a radiation-cured, thermally reversible cross-linking polymer gel. The void material 46A may be preprocessed such as by shredding into suitably sized particles for movement from the hopper 15 into the extruder die orifice 13B. The heating element 15A associated with the first extruder die orifice 13B heats the gel above its liquefaction temperature. Subsequent movement of the void filled harness can cool the liquefied gel below the liquefaction temperature, to return the void fill material 46A to the gel state.

Once past the first extruder die orifice 13B, the filled harness 11A proceeds through the second extruder die orifice 13C. At the second orifice 13C, the jacket 30 is extruded onto exterior of the filled harness 11. Again, as the harness 11 passes through the second die orifice 13C, the jacket material 30A is fed from the hopper 16, is melted by the heating element 16A and is deposited around the filled harness 11. Upon exiting the second orifice 13C, the filled, jacketed harness 11B may pass through a vacuum former 50 of any type well known in the art in order to form the final exterior shape of the jacket 30. As explained above with reference to FIG. 2, after leaving the extruder 13, the jacketed, filled harness 11B may proceed to the cooling channel (17 in FIG. 2) detensioning conveyor (18 in FIG. 2) and is finally stored on the storage reel (19 in FIG. 2).

The particular materials used to fill the streamer segment 46 may be selected from a number of different types, as previously explained. One particularly useful class of such materials for the present embodiment includes radiation cross-linked networked polymers in which the networking can be thermally reversible. The cross-linking polymer is dispersed in hydrocarbon based oil, and is then cross-linked to gel the oil. Cross-linking can be performed by exposure to ultraviolet light or electron beam radiation. In some embodiments as explained above, such gelled hydrocarbon oil may be stored in the hopper 15 after suitable preprocessing, such as shredding, to break the gel into suitably sized particles. When the gel particles are forced into the extruder orifice 13B and heated, the gel temporarily breaks down into a liquid, such that liquid fill material impregnates the harness 11. After cooling below a certain temperature, the liquid returns to the gel state. Examples of thermally reversible gelation compounds are described, for example, in U.S. Pat. No. 4,790,961 issued to Weiss et al., and U.S. Pat. No. 5,892,116 issued to Weiss et al. Additionally, the temperature at which the cross-linking can be broken can be selected by appropriate selection of such materials to be above the ambient operating or storage temperature of the system. The reversible gelation feature of the foregoing gelation agents can also be used advantageously in repairing a streamer segment by heating the segment to be repaired to the necessary temperature, whereby the gel will-liquefy, thus enabling repairs. After the liquefied gel is allowed to cool below the liquefaction temperature, the material will gel once again. Any gel lost in the liquefaction and repair procedure can be replaced with new, uncured gel that is subsequently cured by radiation exposure as explained above. The material used to form the jacket 30 may be a thermoplastic, typically a polyurethane compound.

Figure 4:
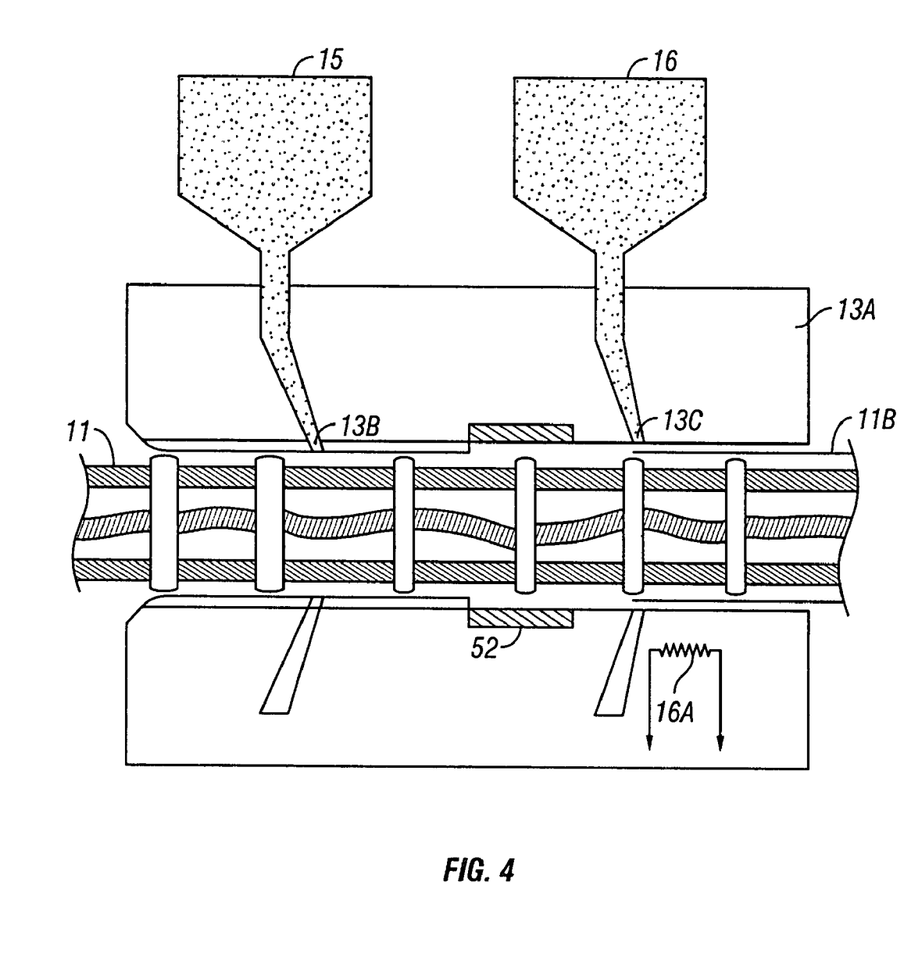
FIG. 4 shows another embodiment of a cross-head extruder.

In another embodiment, and referring to FIG. 4, the extruder head 13A may include substantially the same extrusion die orifices 13B and 13C for application of the fill and jacket materials, respectively, as in the previous embodiment. The extruder (13 in FIG. 2) may also include hoppers 15 and 16, substantially as for the previous embodiment. In the present embodiment, the fill material, disposed in hopper 15, can be in uncured form. In one example, the fill material can be radiation curable, cross-linking polymer dispersed in hydrocarbon-based oil. Thus, in its uncured form, the fill material in hopper 15 can be substantially in liquid form. The material in this embodiment is preferably includes various additives to prove the liquid with thixotropic characteristics. The thixotropic characteristics would help control the flow of the material within the extruder head 13A. As the assembled mechanical harness 11 is pulled through the void filling extruder die 13B, the thixotropic liquid fill material is forced into all the interstitial spaces in the harness 11 and surrounds the harness 11. Immediately downstream of the void filling extruder die, the extruder head 13A may include a radiation source, 52, such as an ultraviolet light source or an electron beam source, depending on the particular gelation agent used in the fill material. Upon exposure to the radiation source 52, the fill material cures into a gel by reason of the polymer becoming cross-linked. The cured, filled harness then passes through the jacket material extruder die 13C, just as in the previous embodiment explained with reference to FIG. 3. Also as in the previous embodiment, the jacket material is liquefied in the extruder head 13A by heating, such as by heating element 16A While not shown in FIG. 4, the present embodiment may include a vacuum former disposed at or near the outlet of the jacket extruder die 13C.

Irrespective of the particular embodiment, the overall operating speed (and corresponding linear speed of movement of the streamer) of the processing line (9 in FIG. 2) will depend primarily on the material used to fill the harness 11, and the cure rate or the rate at which state change to gel of such material takes place.

Referring once again to FIG. 2, the completed streamer, consisting of harness 11, the gelled fill material (46 in FIG. 1) disposed about the harness 11 and filling all the void spaces therein, and the jacket (30 in FIG. 1) may be stored on the storage reel 19 until needed. Sections of the completed streamer material having a selected length may be removed from the reel 19 and processed such as by installation of termination places (36 in FIG. 1) to form streamer segments as explained above with reference to FIG. 1.

Methods and apparatus according to the invention may improve the efficiency with which marine seismic streamers are made, in terms of reduced time to manufacture, reduced size of facilities needed to make the streamers, and in reducing the amount of manual handling of the various streamer components. Streamers made according to the invention may thus have improved reliability over streamers known in the art because of the reduced number of segments, an associated reduced number of connectors. In particular, the invention may make it practical to use gels known in the art for filling a seismic streamer with a continuous manufacturing process and apparatus, where prior processes and apparatus may have been impractical for such use.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for making a marine seismic streamer, comprising:
    a conveyor for transporting assembled mechanical harness from a storage device therefor to a storage device for storing completed marine streamer, the assembled mechanical harness including at least one strength member, a plurality of seismic sensors positioned at spaced apart locations along the strength member, and a conductor harness having at least one conductor coupled to a respective signal output of each seismic sensor;
    a first extruder for filling the harness with a void fill material, the first extruder intermediate the storage device for the harness and the storage device for the completed streamer;
    means for causing a state change in the void fill material from liquid to gel disposed proximate an outlet of the first extruder; and
    a second extruder for depositing jacketing material onto the impregnated harness, the second extruder intermediate the storage device for the harness and the storage device for the completed streamer.

2. The apparatus of claim 1 further comprising a detensioning conveyor disposed between the first and second extruders and the storage device for the completed streamer.

3. The apparatus of claim 1 wherein the first extruder comprises a cross-head extruder.

4. The apparatus of claim 1 wherein the second extruder comprises a cross-head extruder.

5. The apparatus of claim 1 wherein the first and second extruders are disposed within a same head of a cross-head extruder.

6. The apparatus of claim 1 wherein the second extruder comprises a heating element associated therewith for liquefying the jacketing material.

7. The apparatus of claim 1 further comprising a vacuum former after an outlet of the second extruder, the vacuum former configured to form a final external shape of the jacket material.

8. The apparatus of claim 1 wherein the storage device for the completed streamer comprises a motor driven reel.

9. The apparatus of claim 1 further comprising a tensioning conveyor intermediate the storage device for the harness and the first extruder, the tensioning conveyor configured to apply a selected tension to the harness prior to filling thereof with the void fill material.

10. The apparatus of claim 1 further comprising a cooling channel intermediate the second extruder and the storage device for the completed streamer.

11. The apparatus of claim 1 wherein the means for causing a state change comprises a heating element.

12. The apparatus of claim 1 wherein the means for causing state changes comprises an ultraviolet light source.

13. The apparatus of claim 1 wherein the means for causing state change comprises an electron beam radiation source.

14. The apparatus of claim 1 further comprising a microprocessor based controller configured to operate the storage device for the harness, the tensioning conveyor, the first extruder, the second extruder and the storage device for the completed streamer at a selected rate, the rate related to a material used to impregnate the harness.

15. A method for making a marine seismic streamer, comprising:
    conveying assembled mechanical harness from a storage device therefor toward a storage device for completed streamer, the harness including at least one strength member, a plurality of seismic sensors disposed in spacers and positioned at spaced apart locations along the strength member, and a conductor harness having at least one conductor coupled to respective signal output of each seismic sensor;
    filling the harness with a void fill material intermediate the storage device for the harness and the storage device for completed streamer, the void fill material comprising a radiation curable gel;
    causing the void fill material to undergo a state change from liquid to gel proximate an end of a place at which the harness is filled with void material;
    extruding jacketing material onto the gel-filled harness; and
    conveying the gel-filled, extruded harness to the storage device therefor.

16. The method of claim 15 further comprising vacuum forming the jacket after extrusion thereof.

17. The method of claim 16 further comprising cooling the extruded jacketing material after the vacuum forming.

18. The method of claim 15 wherein the state change is performed by cooling below a gel forming temperature of a thermally reversible, cross-linking polymer.

19. The method of claim 15 wherein the state change is performed by exposing the void fill material to radiation.

20. The method of claim 19 wherein the radiation comprises ultraviolet light.

21. The method of claim 19 wherein the radiation comprises electron beam radiation.

22. The method of claim 15 further comprising applying a selected tension on the harness prior to the filling.

* * * * *